United States Patent
Inui et al.

(10) Patent No.: US 12,437,559 B2
(45) Date of Patent: Oct. 7, 2025

(54) PARKING ASSISTANCE DEVICE

(71) Applicant: AISIN CORPORATION, Aichi (JP)

(72) Inventors: Yoji Inui, Kariya (JP); Masaki Furukawa, Kariya (JP); Ryutaro Kato, Kariya (JP); Yuya Shimohira, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/693,238

(22) PCT Filed: Nov. 7, 2022

(86) PCT No.: PCT/JP2022/041375
§ 371 (c)(1),
(2) Date: Mar. 19, 2024

(87) PCT Pub. No.: WO2023/090186
PCT Pub. Date: May 25, 2023

(65) Prior Publication Data
US 2025/0005937 A1  Jan. 2, 2025

(30) Foreign Application Priority Data

Nov. 17, 2021 (JP) ................................. 2021-187194

(51) Int. Cl.
*G06V 20/58* (2022.01)
*G06T 7/13* (2017.01)
(Continued)

(52) U.S. Cl.
CPC .............. *G06V 20/586* (2022.01); *G06T 7/13* (2017.01); *G06T 7/70* (2017.01); *G06V 10/273* (2022.01);
(Continued)

(58) Field of Classification Search
CPC .... G06V 20/586; G06V 10/44; G06V 10/273; G06V 20/588; G06T 7/13; G06T 7/70;
(Continued)

(56) References Cited

U.S. PATENT DOCUMENTS

| | | | | |
|---|---|---|---|---|
| 8,872,674 B1* | 10/2014 | Subramanya | ........... | G01S 13/00 |
| | | | | 340/939 |
| 2016/0272115 A1* | 9/2016 | Max | ........................ | G01S 13/87 |

(Continued)

FOREIGN PATENT DOCUMENTS

| | | |
|---|---|---|
| EP | 2 927 077 A1 | 10/2015 |
| JP | 2019-43455 A | 3/2019 |

(Continued)

OTHER PUBLICATIONS

International Search Report issued Jan. 24, 2023 in International Application No. PCT/JP2022/041375.

(Continued)

*Primary Examiner* — Kerri L McNally
(74) *Attorney, Agent, or Firm* — Sughrue Mion, PLLC

(57) ABSTRACT

Provided is a parking assistance device including a captured image acquisition unit imaging a road surface around a vehicle and an end detector detecting an end of a ground object on the road surface within a detection area in the captured image. A position calculator calculates position information indicating a positional relationship of the end of the ground object. A boundary line determiner determines whether or not a ground object having the end is a boundary line that defines a parking slot for the vehicle. A removal unit determines whether or not a rear end of a ground object determined as the boundary line by the boundary line determination unit is included in a removal range, determines that a ground object determined as the boundary line is not the boundary line when the rear end is included in the (Continued)

removal range, and excludes the ground object from boundary lines.

4 Claims, 11 Drawing Sheets

(51) Int. Cl.
   *G06T 7/70* (2017.01)
   *G06V 10/26* (2022.01)
   *G06V 10/44* (2022.01)
   *G06V 20/56* (2022.01)

(52) U.S. Cl.
   CPC ............ *G06V 10/44* (2022.01); *G06V 20/588* (2022.01); *G06T 2207/20112* (2013.01); *G06T 2207/30256* (2013.01); *G06T 2207/30264* (2013.01)

(58) Field of Classification Search
   CPC . G06T 2207/20112; G06T 2207/30256; G06T 2207/30264
   USPC ....................................................... 340/932.2
   See application file for complete search history.

(56) References Cited

U.S. PATENT DOCUMENTS

| | | | |
|---|---|---|---|
| 2017/0203769 A1* | 7/2017 | Ohta | B60W 50/14 |
| 2017/0357860 A1* | 12/2017 | Lee | G06V 20/58 |
| 2019/0073902 A1* | 3/2019 | Indoh | G06V 20/58 |
| 2019/0286925 A1* | 9/2019 | Yamamoto | B62D 15/0285 |
| 2021/0097324 A1* | 4/2021 | Hoashi | G05D 1/0214 |
| 2021/0179089 A1* | 6/2021 | Hara | B60W 40/06 |
| 2021/0291812 A1* | 9/2021 | Otake | B62D 15/0285 |
| 2021/0402987 A1* | 12/2021 | Kaneko | G06V 10/56 |
| 2023/0054759 A1* | 2/2023 | Robinson | G01S 17/931 |

FOREIGN PATENT DOCUMENTS

| | | |
|---|---|---|
| JP | 2019-163023 A | 9/2019 |
| JP | 2021-64140 A | 4/2021 |

OTHER PUBLICATIONS

Extended European Search Report dated Jan. 22, 2025 in Application No. 22895468.1.

* cited by examiner

PARKING ASSISTANCE DEVICE

CROSS REFERENCE TO RELATED APPLICATIONS

This is a National Stage of International Application No. PCT/JP2022/041375 filed Nov. 7, 2022, claiming priority based on Japanese Patent Application No. 2021-187194 filed Nov. 17, 2021, the entire contents of which are incorporated in their entirety.

TECHNICAL FIELD

An embodiment of the present disclosure relates to a parking assistance device.

BACKGROUND ART

Conventionally, a parking assistance device that assists a parking operation to reduce a burden on a driver when parking a vehicle has been used. Such parking operation assistance includes detection assistance for detecting a parking slot in which the vehicle can be parked, setting assistance for setting a target parking slot in which the host vehicle is parked from the detected parking slot, start position guidance assistance for guiding the vehicle to a parking start position at which parking is started, and parking position guidance assistance for guiding the vehicle from the parking start position to the target parking slot. During a series of these assistance processes, it is important to recognize the boundary line that defines the parking slot.

In such a parking assistance device, the following technique is known: attention is paid to the regularity of set positions of boundary lines, the boundary lines are categorized into a necessary boundary line group and an unnecessary boundary line group based on the front-end position of the detected boundary line and the angles of the boundary line, and the parking target position is calculated from the boundary lines from the necessary boundary line group.

CITATIONS LIST

Patent Literature

Patent Literature 1: JP 2021-64140 A

SUMMARY OF THE DISCLOSURE

Technical Problems

It is desirable for such a parking assistance technique not only to prevent a road surface mark or the like existing within a parking slot from being erroneously detected as a boundary line, but also to detect the boundary line more appropriately.

The present embodiment has been made in view of the above, and provides a parking assistance device that can detect a boundary line defining a parking slot for a vehicle more appropriately and assist parking in a more accurate parking target position.

Solutions to Problems

A parking assistance device of an embodiment includes: a captured image acquisition unit that acquires a captured image obtained by imaging a road surface around a vehicle; an end detection unit that detects an end of a ground object attached to the road surface included in a detection area set in the captured image; a position information calculation unit that calculates position information indicating a positional relationship of the end of the ground object detected with the vehicle; a boundary line determination unit that determines whether or not a ground object having the end is a boundary line that defines a parking slot for the vehicle; and a removal unit that determines whether or not a rear end of a ground object determined as the boundary line by the boundary line determination unit is included in a removal range, determines that a ground object determined as the boundary line is not the boundary line when the rear end is included in the removal range, and excludes the ground object from boundary lines, the removal range being a range that includes a front, an area on a side close to the vehicle, from a position including a vicinity of a front end of a boundary line having a front end on a side farthest from the vehicle before start of a parking operation among the boundary lines.

With this configuration, as an example, it is possible to prevent a ground object such as a road surface mark, located entirely in the front from other boundary lines, from being erroneously detected as a boundary line, more appropriately detect a boundary line that defines a parking slot for the vehicle, and assist parking at a more accurate parking target position.

With this configuration, as an example, it is possible to prevent a ground object such as a road surface mark, included in the range including the front, an area on the closer side to the vehicle, from a position including the vicinity of a front end of a boundary line having the front end on the side farthest from the vehicle before the start of the parking operation among boundary lines, from being erroneously detected as a boundary line, more appropriately detect the boundary line that defines the parking slot for the vehicle, and assist parking at a more accurate parking target position.

Further, the parking assistance device of the embodiment further includes: a determination area setting unit that sets a predetermined determination area along the road surface in the captured image on a basis of position information of an end of the boundary line; and a belonging determination unit that determines whether or not an end of another ground object different from a ground object having the end used for setting the determination area belongs to the determination area. The boundary line determination unit determines whether or not a ground object having the end used for setting the determination area is a boundary line that defines a parking slot for the vehicle on a basis of a determination result of the belonging determination unit, and the removal unit sets the determination area as the removal range, and determines whether or not a rear end of a ground object determined as the boundary line is included in the removal range.

With this configuration, as an example, while reducing labor for setting the removal range it is possible to more appropriately detect the boundary line that defines the parking slot for the vehicle, more appropriately detect the boundary line that defines the parking slot for the vehicle, and assist parking at a more accurate parking target position.

The parking assistance device of the embodiment further includes a determination area setting unit that sets a predetermined determination area along the road surface in the captured image on a basis of position information of an end of the boundary line. The determination area setting unit sets, as a removal range, the determination area set in a predetermined range in a front that is on a side close to the vehicle and a rear that is on a side far from the vehicle with reference to the end of the ground object.

With this configuration, as an example, it is possible to prevent a ground object such as a road surface mark, existing in a predetermined range not only in the front but also in the rear from the vicinity of the front end of the boundary line, from being erroneously detected as a boundary line, more appropriately detect the boundary line that defines the parking slot for the vehicle, more appropriately detect the boundary line that defines the parking slot for the vehicle, and assist parking at a more accurate parking target position.

In the parking assistance device according to the embodiment, the determination area setting unit sets, as a removal range, the determination area set in a predetermined range in a direction orthogonal to the boundary line with reference to the end of the ground object.

With this configuration, as an example, it is possible to prevent a ground object such as a road surface mark, existing in a predetermined range in a direction orthogonal to the boundary line from the vicinity of the front end of the boundary line, from being erroneously detected as a boundary line, more appropriately detect the boundary line that defines the parking slot for the vehicle, more appropriately detect the boundary line that defines the parking slot for the vehicle, and assist parking at a more accurate parking target position.

DESCRIPTION OF EMBODIMENTS

Hereinafter, an exemplary embodiment of the present disclosure will be disclosed. The configuration of the embodiment described below, and the actions, results, and effects brought by the configuration are examples. Aspects of the present disclosure can be achieved by configurations other than that disclosed in the following embodiment, and at least one of various effects based on the basic configuration and derivative effects can be obtained.

Embodiment

A vehicle 1 of the present embodiment may be, for example, an automobile using an internal combustion engine (not shown) as a drive source, that is, an internal combustion engine automobile, an automobile using an electric motor (not shown) as a drive source, that is, an electric automobile, a fuel cell automobile, or the like, a hybrid automobile using both an internal combustion engine and an electric motor as a drive source, or an automobile including another drive source. In the vehicle 1, various transmission devices can be mounted, and various devices necessary for driving the internal combustion engine and the electric motor can be mounted, for example, systems, components, and the like. In addition, the type, number, layout, and the like of devices related to the driving of wheels 3 in the vehicle 1 can be set in various ways.

Figure 1:
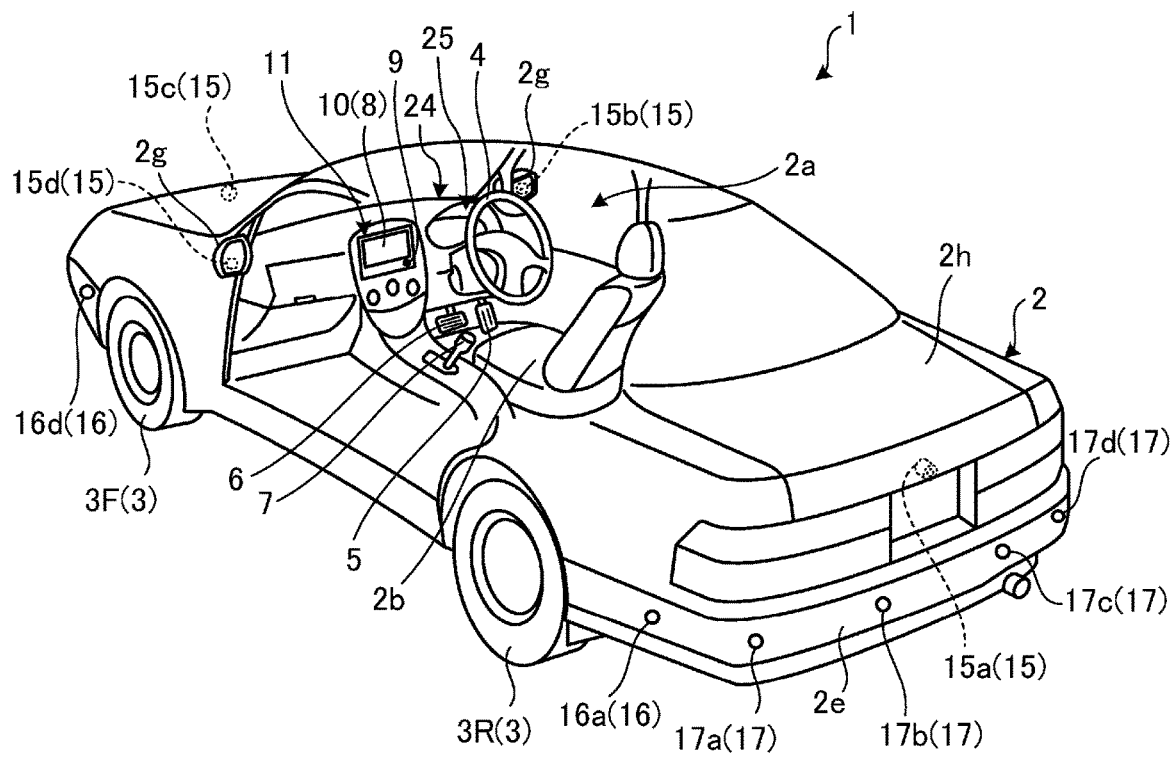
FIG. 1 is an exemplary perspective view showing a state where a part of a vehicle interior of a vehicle according to the present embodiment is in perspective.
Figure 2:
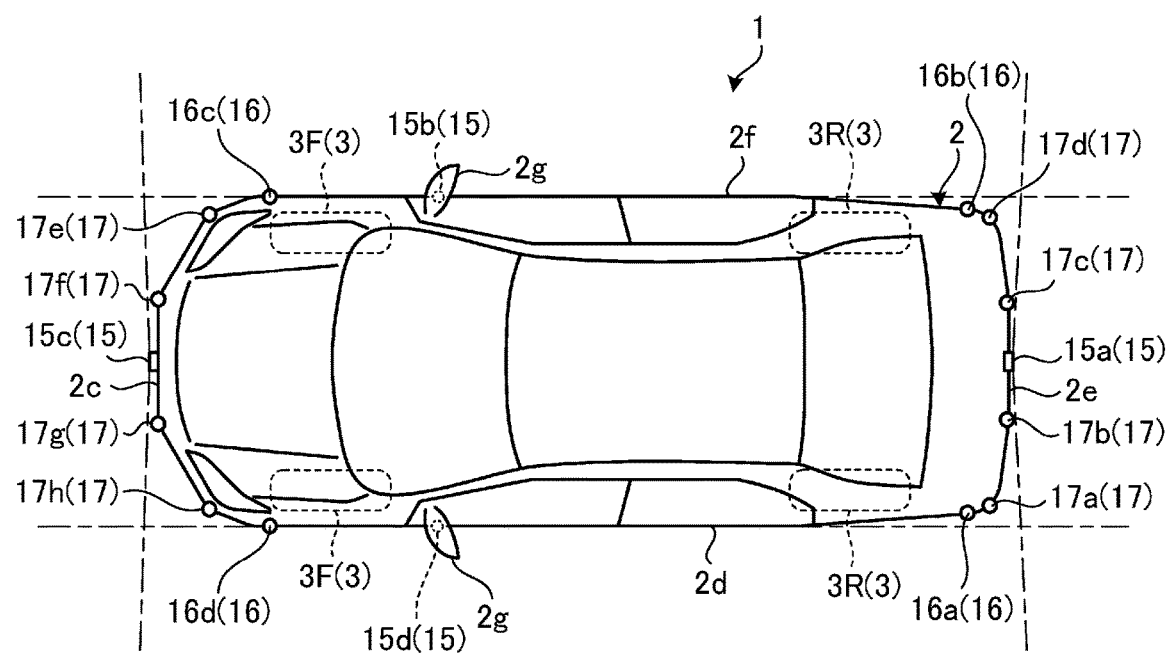
FIG. 2 is an exemplary plan view of the vehicle according to the present embodiment.
Figure 3:
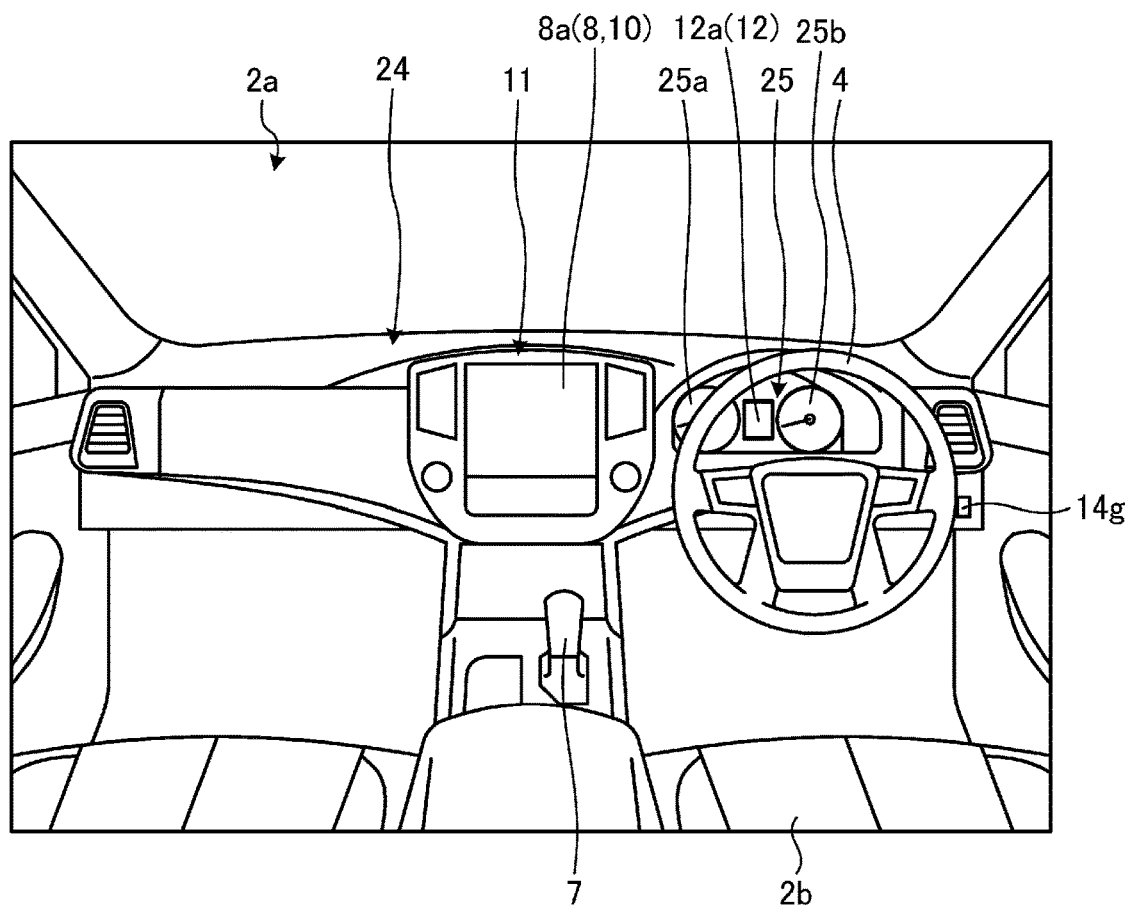
FIG. 3 is a view of an example of the dashboard of the vehicle according to the present embodiment, as viewed from the rear of the vehicle.
Figure 4:
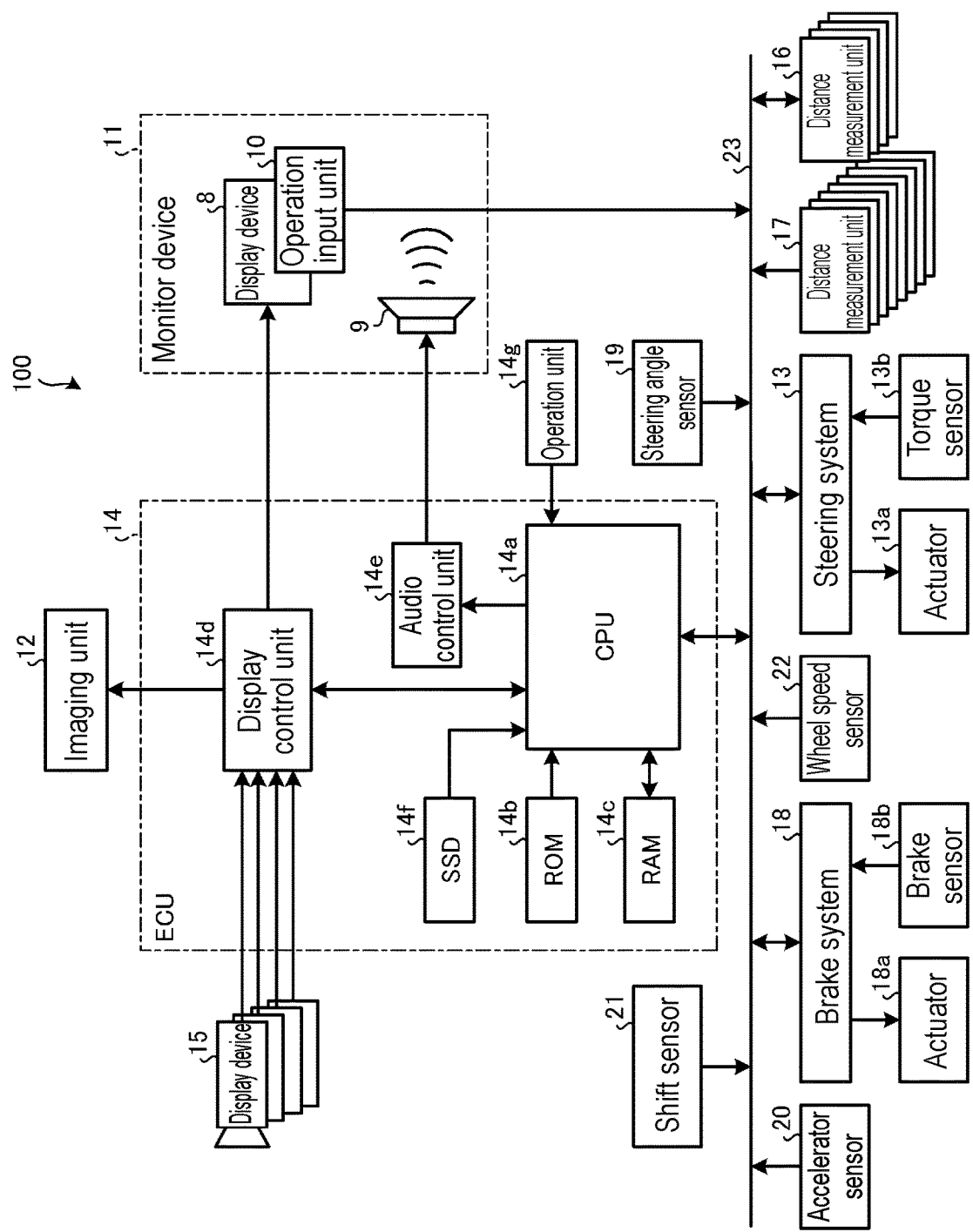
FIG. 4 is an exemplary block diagram of a configuration of a parking assistance system included in the vehicle according to the present embodiment.

FIG. 1 is an exemplary perspective view showing a state where a part of the vehicle interior of the vehicle according to the present embodiment is in perspective. FIG. 2 is an exemplary plan view of the vehicle according to the present embodiment. FIG. 3 is a view of an example of the dashboard of the vehicle according to the present embodiment, as viewed from the rear of the vehicle. FIG. 4 is an exemplary block diagram of a configuration of a parking assistance system included in the vehicle according to the present embodiment.

First, an example of the configuration of the vehicle 1 according to the present embodiment will be described with reference to FIGS. 1 to 4.

As illustrated in FIG. 1, a vehicle body 2 constitutes a vehicle interior 2a in which an occupant (not shown) rides. In the vehicle interior 2a, a steering unit 4, an acceleration operation unit 5, a braking operation unit 6, a shift operation unit 7, and the like are provided in a state of facing a seat 2b of a driver as an occupant.

The steering unit 4 is, for example, a steering wheel protruding from a dashboard 24. The acceleration operation unit 5 is, for example, an accelerator pedal located under the feet of the driver. The braking operation unit 6 is, for example, a brake pedal located under the feet of the driver. The shift operation unit 7 is, for example, a shift lever protruding from a center console. Note that the steering unit 4, the acceleration operation unit 5, the braking operation unit 6, the shift operation unit 7, and the like are not limited thereto.

In the vehicle interior 2a, a display device 8 as a display output unit and an audio output device 9 as an audio output unit are provided. The display device 8 is, for example, a liquid crystal display (LCD), an organic electroluminescent display (OLED), or the like. The audio output device 9 is, for example, a speaker. The display device 8 is covered with a transparent operation input unit 10 such as a touch panel. The occupant can visually recognize an image displayed on the display screen of the display device 8 via the operation input unit 10. In addition, the occupant can perform an operation input by using his or her finger or the like to touch, push, or move across the operation input unit 10 at a position corresponding to an image displayed on the display screen of the display device 8.

The display device 8, the audio output device 9, the operation input unit 10, and the like are provided, for example, in a monitor device 11 located at the center of the dashboard 24 in the vehicle width direction, that is, the left-right direction. The monitor device 11 can include an operation input unit (not shown) such as a switch, a dial, a joystick, and a push button. In addition, an audio output device (not shown) can be provided at another position in the vehicle interior 2a different from the monitor device 11, and audio can be output from the audio output device 9 of the monitor device 11 and another audio output device. Note that the monitor device 11 can also be used as, for example, a navigation system or an audio system.

In the vehicle interior 2a, a display device 12 different from the display device 8 is provided. As illustrated in FIG. 3, the display device 12 is provided, for example, on an instrument panel 25 of the dashboard 24, and is located between a speed indicator 25a and a rotation number indicator 25b substantially at the center of the instrument panel 25. The size of the screen 12a of the display device 12 is smaller than the size of the screen 8a of the display device 8. The display device 12 can mainly display an image indicating information on parking assistance for the vehicle 1. The amount of information displayed on the display device 12 may be smaller than the amount of information displayed on the display device 8. The display device 12 is, for example, an LCD, an OLED, or the like. Note that information displayed on the display device 12 may be displayed on the display device 8.

As illustrated in FIGS. 1 and 2, the vehicle 1 is, for example, a four-wheeled automobile, and includes two left and right front wheels 3F and two left and right rear wheels 3R. All of these four wheels 3 can be configured to be steerable. As illustrated in FIG. 4, the vehicle 1 includes a steering system 13 that steers at least two wheels 3.

The steering system 13 includes an actuator 13a and a torque sensor 13b. The steering system 13 is electrically controlled by an electronic control unit (ECU) 14 or the like to operate the actuator 13a. The steering system 13 is, for example, an electric power steering system, a steer by wire (SBW) system, or the like. In the steering system 13, torque, that is, assist torque, is applied to the steering unit 4 by the actuator 13a to supplement the steering force, and the wheel 3 is steered by the actuator 13a. In this case, the actuator 13a may steer one wheel 3 or may steer a plurality of wheels 3. The torque sensor 13b detects, for example, torque applied to the steering unit 4 by the driver.

As illustrated in FIG. 2, the vehicle body 2 is provided with, for example, four imaging units 15a to 15d as a plurality of imaging units 15. The imaging unit 15 is, for example, a digital camera incorporating an imaging element such as a charge-coupled device (CCD) or a complementary metal-oxide-semiconductor (CMOS) image sensor (CIS). The imaging unit 15 can output moving image data at a predetermined frame rate. Each of the imaging units 15 includes a wide-angle lens or a fisheye lens, and can capture a range of, for example, 140° to 190° in the horizontal direction. The optical axis of the imaging unit 15 is set obliquely downward. Therefore, the imaging unit 15 sequentially captures an external environment around the vehicle body 2 including the road surface on which the vehicle 1 can move and an area where the vehicle 1 can be parked, and outputs the captured environment as captured image data.

The imaging unit 15a is located, for example, at an end 2e on the rear side of the vehicle body 2, and is provided in a wall portion below a door 2h of a rear trunk. The imaging unit 15b is located, for example, at an end 2f on the right side of the vehicle body 2 and is provided on the right door mirror 2g. The imaging unit 15c is located, for example, at an end 2c on the front side of the vehicle body 2, that is, on the front side in the vehicle front-rear direction, and is provided on a front bumper or the like. The imaging unit 15d is located, for example, at an end 2d on the left side of the vehicle body 2, that is, on the left side in the vehicle width direction, and is provided on the door mirror 2g as a left protruding portion. The ECU 14 can execute computational processing and image processing on the basis of image data obtained by the plurality of imaging units 15 to generate an image with a wider viewing angle or generate a virtual overhead image of the vehicle 1 viewed from above. Note that the overhead image can also be referred to as a planar image.

The ECU 14 identifies a boundary line or the like indicated on the road surface around the vehicle 1 from the image data of the imaging unit 15, and detects (extracts) a parking slot indicated by the boundary line or the like.

As illustrated in FIGS. 1 and 2, the vehicle body 2 is provided with, for example, four distance measurement units 16a to 16d and eight distance measurement units 17a to 17h as a plurality of distance measurement units 16, 17. The distance measurement units 16, 17 are sonars that emit ultrasonic waves and capture reflected waves thereof, for example. The sonar can also be referred to as a sonar sensor or an ultrasonic detector. The ECU 14 can measure the presence or absence of an object, such as an obstacle located around the vehicle 1, and the distance to the object from detection results of the distance measurement units 16, 17. That is, the distance measurement units 16, 17 are an example of a detection unit that detects an object. Note that the distance measurement unit 17 can be used, for example, to detect an object at a relatively short distance, and the distance measurement unit 16 can be used, for example, to detect an object at a relatively long distance, beyond the range of the distance measurement unit 17. The distance measurement unit 17 can be used, for example, to detect objects in the front and rear of the vehicle 1, and the distance measurement unit 16 can be used to detect an object to the side of the vehicle 1.

As illustrated in FIG. 4, in a parking assistance system 100, in addition to the ECU 14, the monitor device 11, the steering system 13, the distance measurement units 16, 17, and the like, a brake system 18, a steering angle sensor 19, an accelerator sensor 20, a shift sensor 21, a wheel speed sensor 22, and the like are electrically connected via an in-vehicle network 23 as an electric communication line. The in-vehicle network 23 is configured as, for example, a controller area network (CAN).

The ECU 14 can control the steering system 13, the brake system 18, and the like by sending a control signal through the in-vehicle network 23. Further, the ECU 14 can receive detection results of the torque sensor 13b, the brake sensor 18b, the steering angle sensor 19, the distance measurement unit 16, the distance measurement unit 17, the accelerator sensor 20, the shift sensor 21, the wheel speed sensor 22, and the like, operation signals of the operation input unit 10 and the like via the in-vehicle network 23.

The ECU 14 includes, for example, a central processing unit (CPU) 14a, a read-only memory (ROM) 14b, a random-access memory (RAM) 14c, a display control unit 14d, an audio control unit 14e, a solid-state drive (SSD, flash memory) 14f, and the like.

The CPU 14a can execute various types of computational processing and control, such as image processing related to images displayed on the display devices 8, 12, determining a target position for the vehicle 1, calculating a movement route of the vehicle 1, determining the presence or absence of interference with an object, automatically controlling the vehicle 1, and canceling the automatic control. The CPU 14a can read a program installed and stored in a nonvolatile storage device such as the ROM 14b and execute computational processing according to the program.

The RAM 14c temporarily stores various data used in the calculation in the CPU 14a. The display control unit 14d mainly executes image processing using image data obtained by the imaging unit 15, composition of image data displayed on the display device 8, and the like, among the computational processing in the ECU 14. The audio control unit 14e mainly executes processing for audio data output by the audio output device 9 among the computational processing in the ECU 14. The SSD 14f is a rewritable nonvolatile storage unit, and can store data even if the power supply of the ECU 14 is turned off. Note that the CPU 14a, the ROM 14b, the RAM 14c, and the like can be integrated in the same package. The ECU 14 may have a configuration in which, instead of the CPU 14a, another logical operation processor such as a digital signal processor (DSP), a logic circuit, or the like is used. Further, a hard disk drive (HDD) may be provided instead of the SSD 14f, and the SSD 14f and the HDD may be provided separately from the ECU 14.

The brake system 18 is, for example, an anti-lock brake system (ABS) that suppresses locking of a brake, an electronic stability control (ESC) that suppresses skidding of the vehicle 1 at the time of cornering, an electric brake system that enhances braking force (executes brake assist), a brake by wire (BBW), or the like. The brake system 18 applies braking force to the wheel 3 and thus the vehicle 1 via the actuator 18a. In addition, the brake system 18 can execute various controls by detecting brake lock-up, idle rotation of the wheel 3, a sign of skidding, or the like from the difference in the rotations of the left and right wheels 3, or the like. The brake sensor 18b is, for example, a sensor that detects the position of the movable portion of the braking operation unit 6. The brake sensor 18b can detect the position of the brake pedal as the movable portion. The brake sensor 18b includes a displacement sensor.

The steering angle sensor 19 is, for example, a sensor that detects the amount of steering of the steering unit 4 such as a steering wheel. The steering angle sensor 19 is configured using, for example, a Hall element or the like. The ECU 14 acquires the amount of steering of the steering unit 4 by the driver, the amount of steering of each wheel 3 at the time of automatic steering, and the like from the steering angle sensor 19 and executes various controls. Note that the steering angle sensor 19 detects the rotation angle of the rotating portion included in the steering unit 4.

The accelerator sensor 20 is, for example, a sensor that detects the position of the movable portion of the acceleration operation unit 5. The accelerator sensor 20 can detect the position of the accelerator pedal as the movable portion. The accelerator sensor 20 includes a displacement sensor.

The shift sensor 21 is, for example, a sensor that detects the position of the movable portion of the shift operation unit 7. The shift sensor 21 can detect positions of a lever, an arm, a button, and the like as the movable portion. The shift sensor 21 may include a displacement sensor or may be configured as a switch.

The wheel speed sensor 22 is a sensor that detects the amount of rotation of the wheel 3 and the number of rotations per unit time. The wheel speed sensor 22 outputs the number of wheel speed pulses indicating the detected number of rotations as a sensor value. The wheel speed sensor 22 can be configured using, for example, a Hall element or the like. The ECU 14 calculates the amount of movement and the like of the vehicle 1 on the basis of the sensor value acquired from the wheel speed sensor 22 and executes various controls. Note that the wheel speed sensor 22 may be provided in the brake system 18. In this case, the ECU 14 acquires the detection result of the wheel speed sensor 22 via the brake system 18.

Note that the configurations, arrangements, electrical connection forms, and the like of the various sensors and actuators described above are merely examples, and can be set (changed) in various ways.

Figure 5:
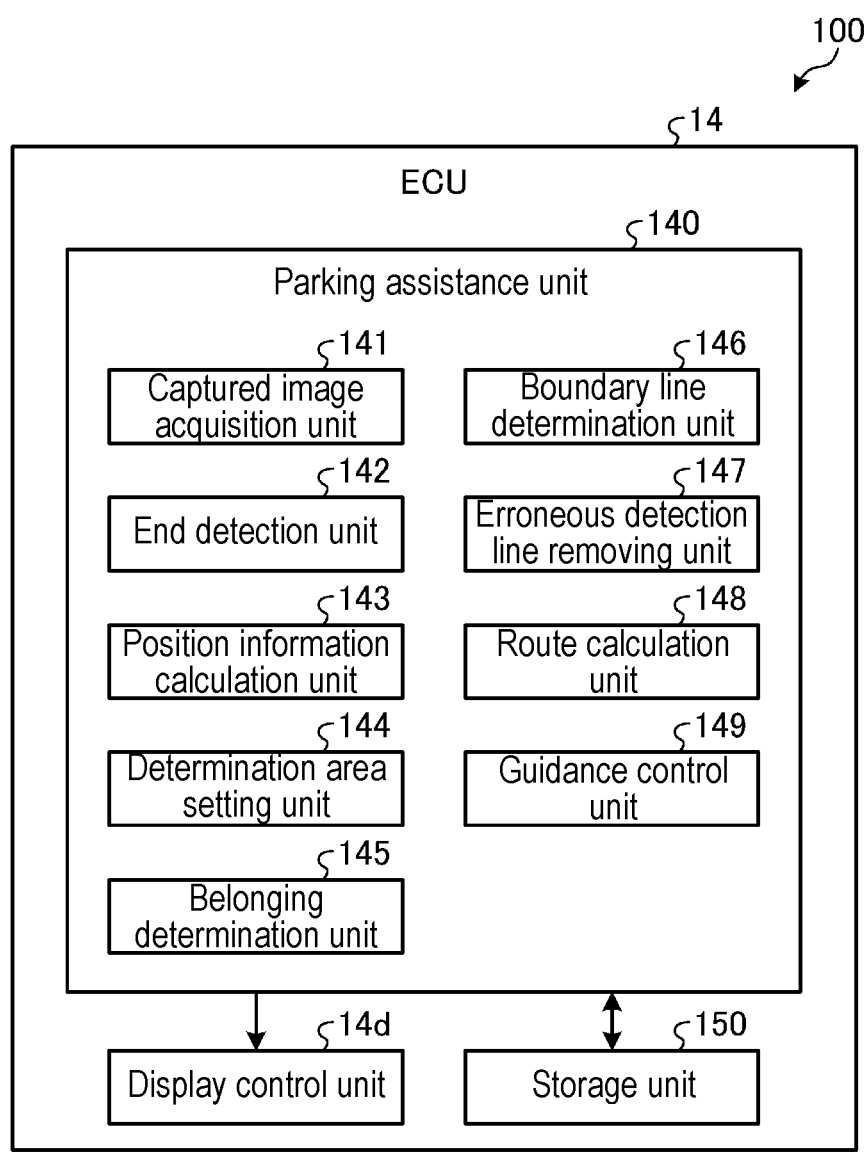
FIG. 5 is a diagram showing an example of a functional configuration of an electronic control unit (ECU) included in the vehicle according to the present embodiment.

Next, an example of the functional configuration of the ECU 14 included in the vehicle 1 according to the present embodiment will be described with reference to FIG. 5. FIG. 5 is a diagram showing an example of the functional configuration of the ECU included in the vehicle according to the present embodiment.

As shown in FIG. 5, the ECU 14 according to the present embodiment is an example of a parking assistance device including a captured image acquisition unit 141, an end detection unit 142, a position information calculation unit 143, a determination area setting unit 144, a belonging determination unit 145, a boundary line determination unit 146, an erroneously-detected line removal unit 147, a route calculation unit 148, a guidance control unit 149, the display control unit 14d, and the like. In the present embodiment, the CPU 14a reads and executes a program stored in a storage device such as the ROM 14b or the SSD 14f, thereby achieving various functional modules such as the captured image acquisition unit 141, the end detection unit 142, the position information calculation unit 143, the determination area setting unit 144, the belonging determination unit 145, the boundary line determination unit 146, the erroneously-detected line removal unit 147, the route calculation unit 148, the guidance control unit 149, and the display control unit 14d.

In the present embodiment, various functional modules such as the captured image acquisition unit 141, the end detection unit 142, the position information calculation unit 143, the determination area setting unit 144, the belonging determination unit 145, the boundary line determination unit 146, the erroneously-detected line removal unit 147, the route calculation unit 148, the guidance control unit 149, and the display control unit 14d are achieved by a processor such as the CPU 14a reading and executing a program stored in the storage device such as the ROM 14b or the SSD 14f. However, the present disclosure is not limited thereto. For example, various functional modules such as the captured image acquisition unit 141, the end detection unit 142, the position information calculation unit 143, the determination area setting unit 144, the belonging determination unit 145, the boundary line determination unit 146, the erroneously-detected line removal unit 147, the route calculation unit 148, the guidance control unit 149, and the display control unit 14d can be achieved by independent hardware. Further, various functional modules such as the captured image acquisition unit 141, the end detection unit 142, the position information calculation unit 143, the determination area setting unit 144, the belonging determination unit 145, the boundary line determination unit 146, the erroneously-detected line removal unit 147, the route calculation unit 148, the guidance control unit 149, and the display control unit 14d are merely examples, and as long as similar functions can be achieved, the functional modules may be integrated or subdivided.

The captured image acquisition unit 141 acquires a captured image obtained by capturing the road surface around vehicle 2. Note that examples of the periphery of the vehicle 2 include, but are not limited to, the side of the vehicle 2. As described above, in the present embodiment, the imaging unit 15b is provided on the right door mirror 2g, and the imaging unit 15*d* is provided on the door mirror 2*g* as a left protrusion. Therefore, the imaging unit 15*b* captures a captured image of the road surface on the right outer side of the vehicle body 2 (hereinafter referred to as a "right captured image"), and the imaging unit 15*d* captures a captured image of the road surface on the left outer side of the vehicle body 2 (hereinafter referred to as a "left captured image"). The captured image acquisition unit 141 acquires the right captured image from the imaging unit 15*b*, and acquires the left captured image from the imaging unit 15*d*. Here, the imaging unit 15*b* and the imaging unit 15*d* continuously capture the right captured image and the left captured image, respectively. Therefore, the captured image acquisition unit 141 also continuously acquires the right captured image and the left captured image. Further, in the present embodiment, the imaging unit 15*b* and the imaging unit 15*d* image the road surface around the vehicle 1 via the fisheye lenses. Therefore, the right captured image and the left captured image in the present embodiment are so-called fisheye images. As is well known, a fisheye image has a wider imaging range (wider angle of view), but the further away from the imaging center (optical axis center), the more distortion occurs, making it difficult to grasp a scene included in the captured image. Therefore, in the present embodiment, for facilitating understanding, a description will be provided using an image obtained by converting a fisheye image into a planar view image. Even in the processing in the parking assistance system 100, a fisheye image may be converted into a planar image and handled, or the fisheye image may be handled as it is.

The end detection unit 142 detects an end of a ground object (hereinafter also simply referred to as a "ground object") attached to the road surface included in the captured image. The end detection unit 142 sets a detection area used as an area for detecting the end of the ground object along the road surface included in the captured image. The detection area is preferably set longer than the vehicle length along the vehicle length direction of the vehicle 1 and longer than the vehicle width along the vehicle width direction of the vehicle 1. In the present embodiment, the detection area is an area included in the captured image captured by the imaging unit 15 and is a preset area.

Here, the ground object is an index, a block, or the like of a boundary line or the like attached to the road surface. The end detection unit 142 detects the end of the index such as a boundary line or the block in the detection area set on the captured image described above. Although this detection is known and thus detailed description is omitted, for example, the detection can be performed by performing edge detection by known edge extraction in the detection area and determining whether or not the detected edge is the index, the block, or the like on the basis of the detected edge.

In the present embodiment, the end detection unit 142 detects the end of the ground object on the vehicle 1 side having a straight portion extending along a direction intersecting the traveling direction of the vehicle 1. That is, the end detection unit 142 first detects a ground object in the detection area and specifies a straight portion in the detected ground object. Next, the end detection unit 142 determines whether or not the extending direction of the portion along the straight portion intersects the traveling direction of the vehicle 1. When the extending direction intersects the traveling direction, the end detection unit 142 detects the end of the ground object on the side closer to the vehicle 1 in the portion along the straight portion in the present embodiment.

The position information calculation unit 143 calculates position information indicating a positional relationship with the vehicle 1 for the detected end of the ground object. The detected end of the ground object is the end (particularly, a corner portion) of the ground object on the vehicle 1 side in the straight portion detected by the end detection unit 142 described above in the present embodiment. The position information indicating the positional relationship with the vehicle 1 is information indicating the end of the ground object and its relative position with respect to the vehicle 1. For example, the relative position can be configured such that the coordinates of the ground object are indicated by coordinates or a map set based on a predetermined position of the vehicle 1 (the center in the vehicle width direction of the pair of left and right drive wheels), or can be configured such that the relative position is indicated by a difference between the latitude and longitude information of the ground object and the latitude and longitude of the vehicle 1. In addition, the relative position with respect to the end of the ground object changes according to the travel of the vehicle 1, and this is preferably calculated on the basis of, for example, global positioning system (GPS) information (position information) of the vehicle 1 according to the travel of the vehicle 1.

Note that, in the present embodiment, the position information calculated by the position information calculation unit 143 is stored in a storage unit 150. Here, the storage unit 150 may be configured to store all pieces of position information detected in the past, or may be configured to store a predetermined number (e.g., 10 pieces) from the latest one among all pieces of position information detected in the past from the viewpoint of a storage capacity and a computational processing load.

The determination area setting unit 144 sets a predetermined determination area along the road surface in the captured image on the basis of the position information of an end of the boundary line. The position information of an end of the boundary line is calculated by the position information calculation unit 143, and is stored in the storage unit 150 in the present embodiment. The determination area is used when it is determined whether or not the end of the detected ground object is an end of a boundary line that defines a parking slot for the vehicle 1.

Figure 6:
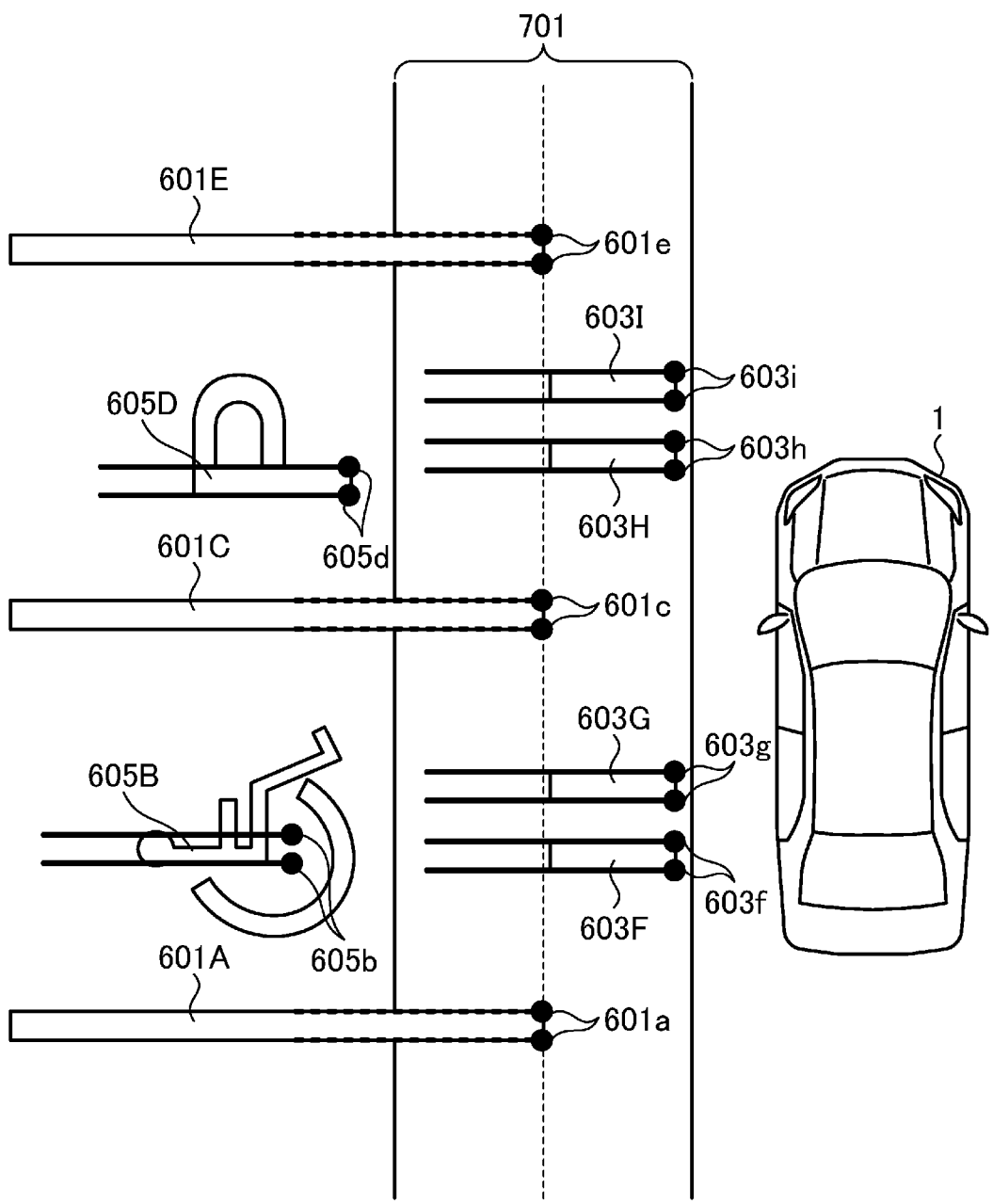
FIG. 6 is a schematic diagram showing an example of a determination area according to the present embodiment.
Figure 7A:
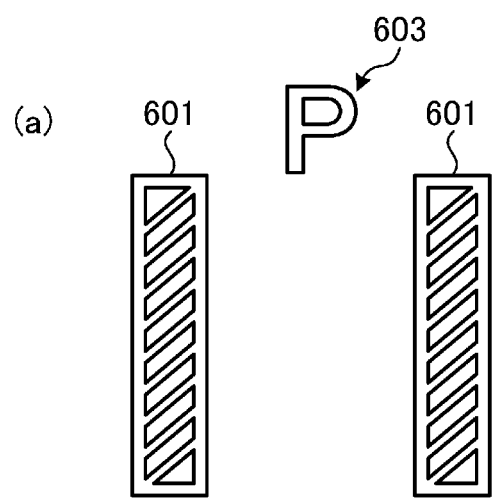
FIGS. 7A to 7D are diagrams showing an example of a road surface mark according to the present embodiment.
Figure 7B:
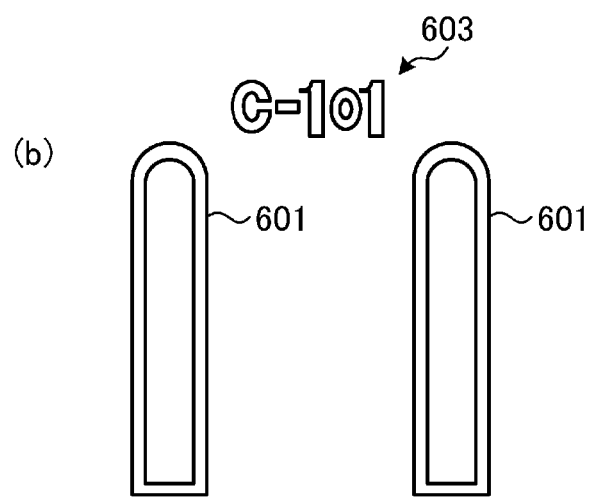
Figure 7C:
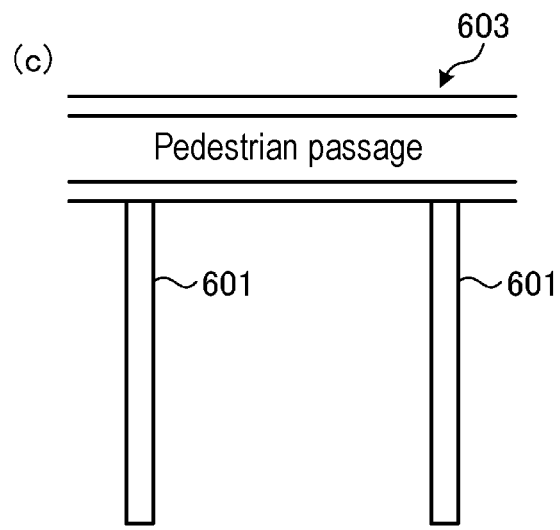
Figure 7D:
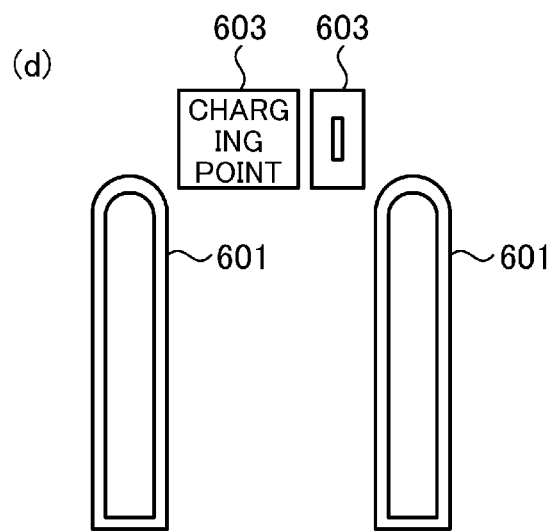

FIG. 6 is a schematic diagram showing an example of a determination area according to the present embodiment. FIG. 6 shows an example of a determination area 701. In the example of FIG. 6, the determination area 701 is set based on an end 601*a* of the ground object. Setting with reference to the end 601*a* means setting in contact with the end 601*a*. The determination area is set using the position information of the end described above.

In addition, the determination area 701 is set to extend along a first direction that is the traveling direction of the vehicle 1, have a predetermined length in a second direction intersecting the first direction, and include the end, and an angle formed by the extending direction of the determination area 701 and the first direction is set within a preset angle. The traveling direction of the vehicle 1 can be calculated on the basis of the GPS information of the vehicle 1, and is shown along the vehicle length direction of the vehicle 1 in FIG. 6. The predetermined length in the second direction intersecting the first direction means that the determination area is set to have a predetermined width instead of a line, and is preferably set to, for example, about several tens of cm to 1 m. In the example of FIG. 6, the end is set to be located at the center of the determination area 701 in the width direction. The angle formed by the extending direction of the determination area and the first direction is an index indicating parallelism between the extending direction of the determination area and the first direction, and in the present embodiment, the angle formed is set to 0 degrees. Therefore, the determination area is set parallel to the first direction (the traveling direction of the vehicle 1).

The belonging determination unit 145 determines whether or not the end of another ground object, different from a ground object having an end, belongs to the determination area. The ground object having the end is a ground object having an end used as a reference in the setting of the determination area 701. In the example of FIG. 6, the end 601a of a straight portion 601A corresponds to this end. Another ground object being different is an end of a ground object different from the ground object having the end used as the reference in the setting of the determination area 701.

In the example of FIG. 6, an end 605b of a straight portion 605B, an end 601c of a straight portion 601C, an end 605d of a straight portion 605D, an end 601e of a straight portion 601E, an end 603f of a straight portion 603F, an end 603g of a straight portion 603G, an end 603h of a straight portion 603H, and an end 603i of a straight portion 603I each correspond the end described above. Whether or not to the end belongs to the determination area 701 means whether or not the end is included in the determination area 701, and such determination as to whether or not the end belongs to the determination area 701 is referred to as belonging determination. Therefore, in the setting of the determination area 701, the belonging determination unit 145 determines whether or not the end of the ground object different from the ground object having the end used as the reference is included in the determination area 701.

In the example of FIG. 6, with the determination area 701 being set based on the end 601a, it is determined whether or not the end 605b, the end 601c, the end 605d, the end 601e, the end 603f, the end 603g, the end 603h, and the end 603i detected by the end detection unit 142 are included in the determination area 701. In the determination as well, the position information described above is used. In the example of FIG. 6, the end 605b and the end 605d are not included in the determination area 701, but the other ends, that is, the end 601c, the end 601e, the end 603f, the end 603g, the end 603h, and the end 603i are included in the determination area 701.

Such belonging determination is performed by setting a determination area with reference to each of the ends where the position information is stored in the storage unit 150. That is, not only the belonging determination is performed based on the end 601a shown in FIG. 6, but also the belonging determination is performed based on a determination area set based on each of the other ends, that is, the end 605b, the end 601c, the end 605d, the end 601e, the end 603f, the end 603g, the end 603h, and the end 603i.

When the belonging determination is performed for each end, the boundary line determination unit 146 determines whether or not the ground object having the end used to set the determination area is a boundary line that defines a parking slot for the vehicle 1 on the basis of the determination result of the belonging determination unit 145. The determination result of the belonging determination unit 145 is transmitted to the boundary line determination unit 146 when the belonging determination unit 145 performs the belonging determination.

Here, in the present embodiment, in the belonging determination for ends including a newly detected end, the boundary line determination unit 146 determines ground objects having the ends included in the determination areas of each other as boundary lines. That is, when the belonging determination is performed by the determination area based on the end 601a, the end 601c is included in the determination area, and when the belonging determination is performed by the determination area based on the end 601c, the end 601a is included in the determination area. Note that, as a matter of course, the determination area based on the end 601a also includes the end 601a, and the determination area based on the end 601c also includes the end 601c. Therefore, the end 601a and the end 601c are included in the determination areas of each other. Therefore, the boundary line determination unit 146 determines that the ground object having the end 601a and the ground object having the end 601c are ground objects that define the parking slot.

In the example of FIG. 6, the boundary line determination unit 146 determines that the end 601a, the end 601c, the end 601e, the end 603f, the end 603g, the end 603h, and the end 603i are ground objects that define parking slots, that is, boundary lines, from the result of the belonging determination based on all the ends as described above. The boundary line determination unit 146 stores, as boundary line information, position information of the ground object determined as the boundary line and its end, and the like in the storage unit 150.

In the present embodiment, every time a new end is detected as the vehicle 1 travels, the belonging determination unit 145 determines whether or not an end having been detected so far and is included in the detection area belongs to a determination area set with reference to the newly detected end, and also determines whether or not another end belongs to a determination area set with reference to each end for each of the ends detected so far. In addition, the belonging determination unit 145 performs the belonging determination including an end not included in the detection area but stored in the storage unit 20.

However, as shown in the example of FIG. 6, it is understood that a ground object having each of the end 601a, the end 601c, and the end 601e is a boundary line that defines a parking slot, but any ground object having each of the end 603f, the end 603g, the end 603h, and the end 603i has a short distance between the lines and cannot be a parking slot. Therefore, these ground objects are not boundary lines that define parking slots, but are lines that have been erroneously detected. That is, there is a case where erroneous detection is performed also in the boundary line determination described above.

In the present embodiment, the accuracy of the boundary line determination is improved by removing such erroneously detected lines from boundary lines determined as boundary lines. Therefore, the ECU 140 of the present embodiment further includes an erroneously-detected line removal unit 147 as a removal unit.

Such an erroneously detected line is caused by a ground object of a road surface mark. The ground object of the road surface mark exists in the front of the parking slot, that is, on the vehicle side before the start of parking assistance. FIGS. 7A to 7D are diagrams showing an example of the road surface mark. There is a possibility that a vertical line of each of road surface marks 603 shown in FIGS. 7A to 7D is determined as the boundary line. Each of these road surface marks 603 exists entirely in the front of the boundary lines 601 constituting the parking slot.

For this reason, among the ground objects determined as the boundary lines by the boundary line determination unit 146, the erroneously-detected line removal unit 147 of the present embodiment determines that a ground object located entirely in the front of other boundary lines and its end are not the boundary line, and deletes and excludes the ground object from the boundary lines stored in the storage unit 150.

Specifically, the erroneously-detected line removal unit 147 of the present embodiment sets a removal range. Here, the removal range is a range including the front from a position including the vicinity of a front end of a boundary line having the front end on the side farthest from the vehicle 1 before the start of the parking operation among the boundary lines.

Then, the erroneously-detected line removal unit 147 specifies the rear end of the ground object determined as the boundary line by the boundary line determination unit 146. Here, the position information of the rear end is stored in the storage unit 150 as boundary line information, and the erroneously-detected line removal unit 147 reads the position information of the rear end of each boundary line from the storage unit 150 and specifies the rear end.

The erroneously-detected line detection unit 147 determines whether or not the rear end of the ground object is included in the removal range on the basis of the position information of the rear end and the removal range. When determining that the rear end is included in the removal range, the erroneously-detected line detection unit 147 determines that the ground object determined as the boundary line is not the boundary line, and deletes the ground object from the boundary lines in the storage unit 150 for exclusion from the boundary lines. On the other hand, when determining that the rear end is not included in the removal range, the erroneously-detected line detection unit 147 treats the ground object determined as the boundary line as it is as a boundary line, and thus does not delete the ground object from the boundary lines in the storage unit 150.

Figure 8:
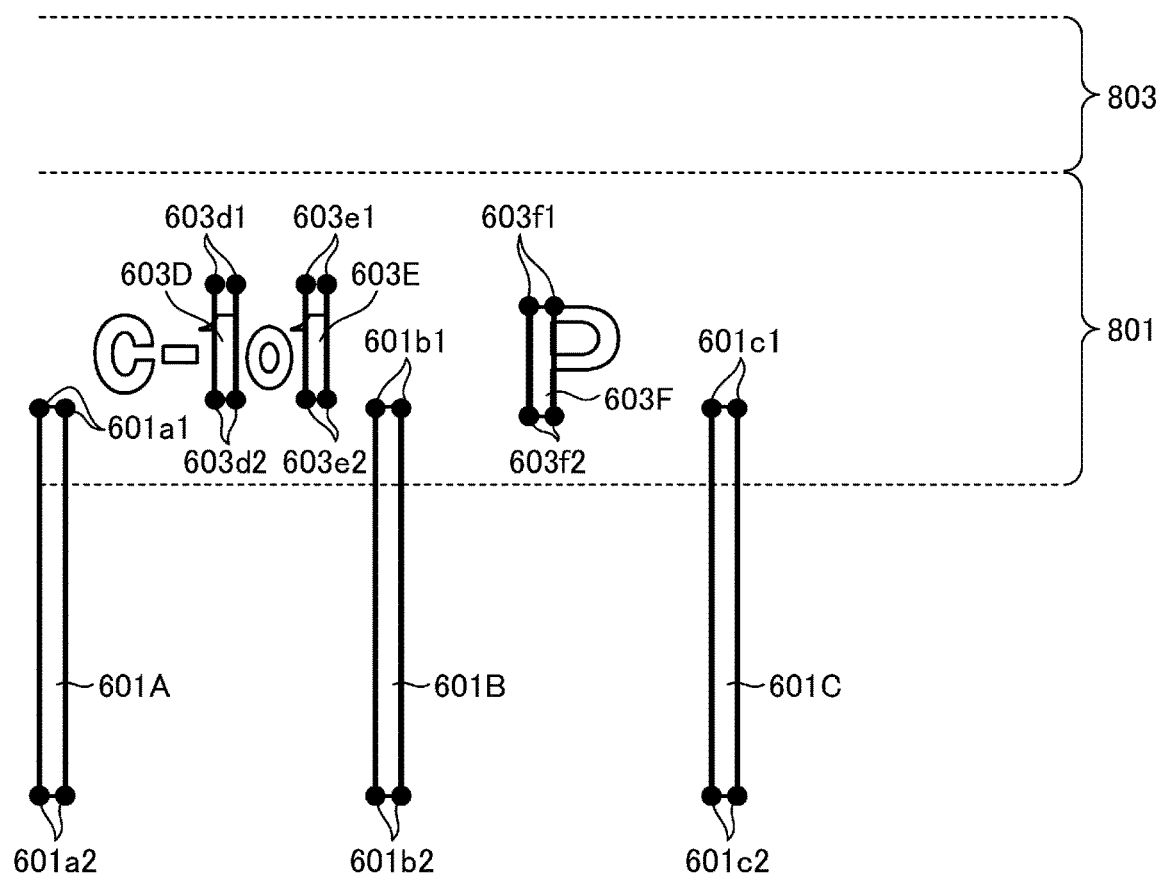
FIG. 8 is a view showing an example of a removal range and boundary lines according to the present embodiment.

FIG. 8 is a diagram showing an example of the removal range and boundary lines according to the present embodiment. In the example of FIG. 8, the boundary line determination unit 146 determines a ground object having each of the straight portions 601A, 601B, 601C, 603D, 603E, 603F as a boundary line, and stores position information and the like of the ground object as a boundary line in the storage unit 150. Among the determined boundary lines 601A, 601B, 601C, 603D, 603E, 603F, the boundary lines 601A, 601B, 601C are the boundary lines having the front ends on the farthest side from the vehicle 1 before the start of the parking operation. Therefore, the erroneously-detected line removal unit 147 sets a range in the front from the vicinity of front ends 601a1, 601b1, 601c1 of the respective boundary lines 601A, 601B, 601C as a removal range 801. FIG. 8 shows an example in which a range from the vicinity of the front ends 601a1, 601b1, 601c1 of the respective boundary lines 601A, 601B, 601C to the end on the parking slot side of the traveling route 803 of the vehicle 1 before the start of the parking operation is set as the removal range 801, but the removal range is not limited thereto.

Then, in the example of FIG. 8, the erroneously-detected line removal unit 147 determines whether or not the rear ends of the boundary lines 601A, 601B, 601C, 603D, 603E, 603F are included in the removal range 801. As shown in FIG. 8, a rear end 603d2 of the boundary line 603D, a rear end 603e2 of the boundary line 603E, and a rear end 603f2 of the boundary line 603F are included in the removal range 801.

On the other hand, a rear end 601a2 of the boundary line 601A is not included in the removal range 801. Further, a rear end 601b2 of the boundary line 601B is not included in the removal range 801. Similarly, a rear end 601c2 of the boundary line 601C is not included in the removal range 801.

Therefore, the erroneously-detected line removal unit 147 determines that the boundary lines 603D, 603E, 603F are not boundary lines, and deletes the boundary lines from the boundary line information in the storage unit 150, leading to exclusion from the boundary lines. On the other hand, the erroneously-detected line removal unit 147 maintains the determination that the boundary lines 601A, 601B, 601C are boundary lines.

Returning to FIG. 5, the route calculation unit 148 determines the target parking position on the basis of the parking slot defined by the boundary line, and calculates a movement route from the current position of the vehicle 1 to the target parking position. Note that the current position of the vehicle 1 is detected on the basis of outputs of the wheel speed sensor 22, the steering angle sensor 19, and the like. Note that the vehicle 1 may include a global positioning system (GPS) receiver (not shown in FIG. 3) to perform GPS positioning, thereby detecting the current position.

The guidance control unit 149 controls each unit of the vehicle 1 so that the vehicle 1 moves to the movement target position along the movement route. The display control unit 14d is as described above.

Figure 9:
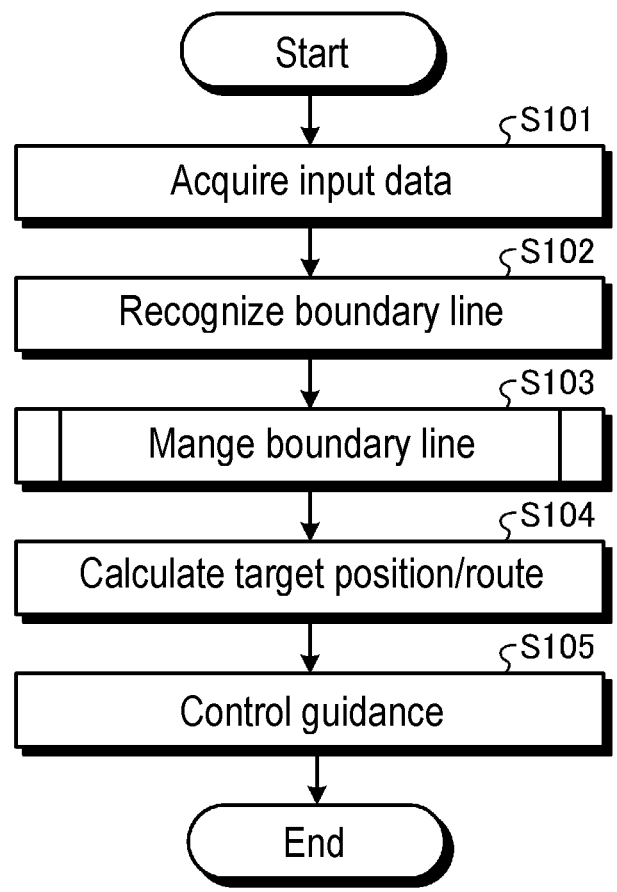
FIG. 9 is a flowchart showing a procedure for a parking assistance process according to the embodiment.

Next, for a parking assistance process by the parking assistance system of the present embodiment configured as described above will be described. FIG. 9 is a flowchart showing a procedure for the parking assistance process of the present embodiment.

First, the ECU 140 acquires various input data necessary for parking assistance, such as a captured image from the captured image acquisition unit 141 (S101). Then, the ECU 140 executes a boundary line recognition process (S102). Here, the boundary line recognition process is executed as described above by the end detection unit 142, the position information calculation unit 143, the determination area setting unit 144, the belonging determination unit 145, and the boundary line determination unit 146, and the boundary line is specified for each captured image.

Figure 10:
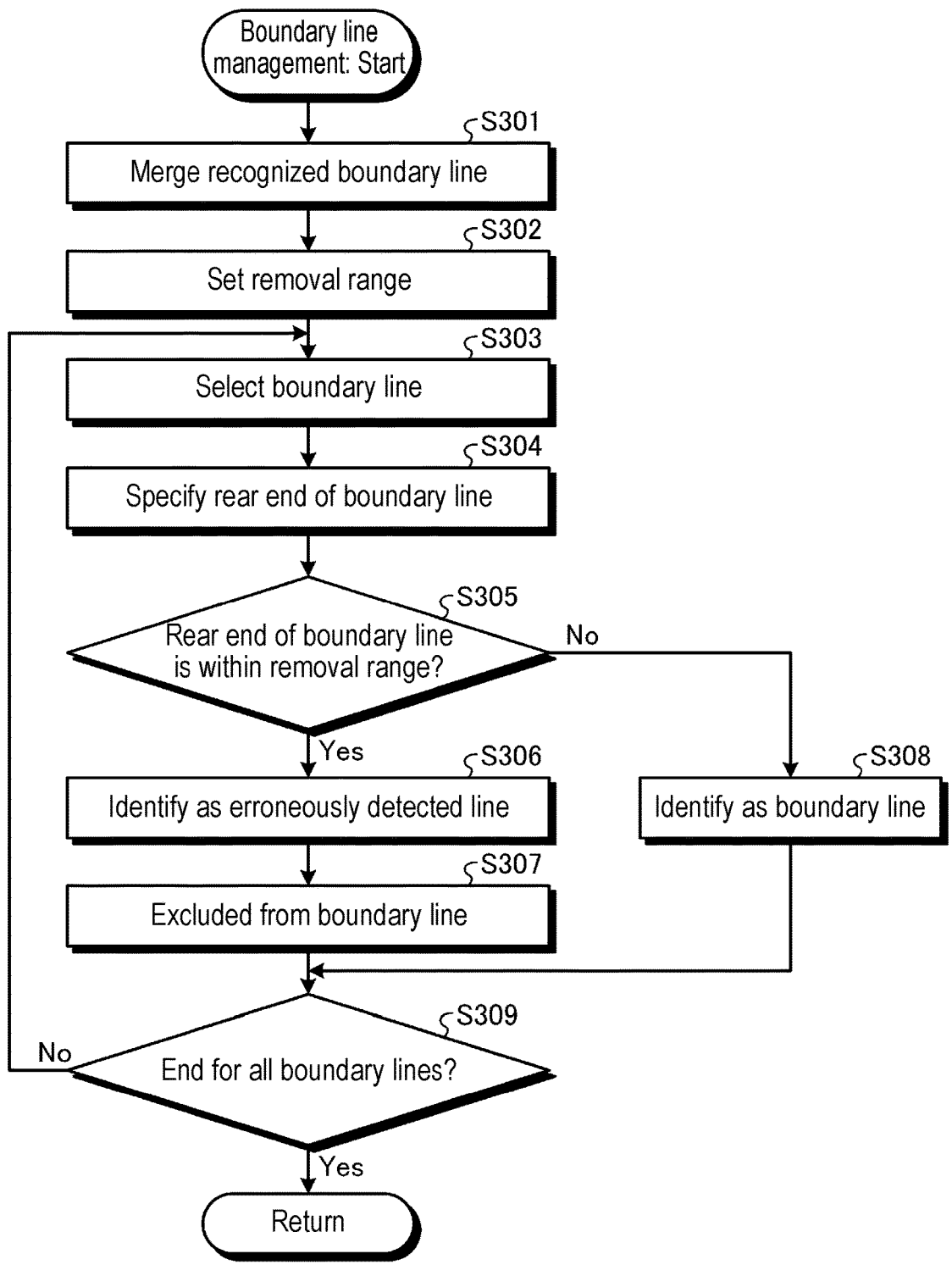
FIG. 10 is a flowchart showing an example of a procedure for a boundary line management process according to the present embodiment.

Next, the ECU 140 executes a boundary line management process (S104). Here, the boundary line management process will be described. FIG. 10 is a flowchart showing an example of a procedure for the boundary line management process according to the present embodiment.

First, the boundary line determination unit 146 merges boundary lines recognized for each captured image (S301). As a result, the position information of all the boundary lines and the front and rear ends thereof is stored in the storage unit 150 as boundary line information. Note that, at the beginning of the boundary line management process, the user may select a mode of performing the process on all the boundary lines or performing the process on some of the boundary lines.

Next, the erroneously-detected line removal unit 147 sets, as a removal range, a predetermined range in the front from the vicinity of a front end of a boundary line having the front end on the side farthest from the vehicle 1 before the start of the parking operation among the boundary lines (S302). Then, erroneously-detected line removal unit 147 selects one of the boundary lines (S303).

The erroneously-detected line removal unit 147 specifies the rear end of the selected boundary line (S304). Next, the erroneously-detected line removal unit 147 determines whether or not the rear end of the boundary line is included in the removal range on the basis of the position information (S305). When the rear end of the boundary line is included in the removal range (S305: Yes), the erroneously-detected line removal unit 147 determines that the selected boundary line is an erroneously detected line (S306). Then, the erroneously-detected line removal unit 147 deletes the position information of the boundary line from the boundary line information of the storage unit 150 for removal from the boundary lines (S307).

On the other hand, when the rear end of the boundary line is not included in the removal range in S305 (S305: No), the selected boundary line is identified once again as a boundary line, rather than being identified as an erroneously detected line (S308).

Next, it is determined whether or not the process has ended for all the boundary lines (S309), and when the process has not ended (S309: No), the process returns to S303, the next boundary line is selected, and the processes from S304 to S308 are executed. When the process has ended for all the boundary lines in S309 (S309: Yes), the boundary line management process is finished.

Returning to FIG. 9, when the boundary line management process is completed, the route calculation unit 148 calculates the target parking position on the basis of the parking slot defined by the boundary line, and calculates a route from the current position of the vehicle 1 to the target parking position (S104). Then, the guidance control unit 149 executes the guidance control of the vehicle 1 along the calculated route (S105). Thus, the parking assistance process is completed.

As described above, in the present embodiment, among the ground objects determined as the boundary lines, the erroneously-detected line removal unit 147 determines that a ground object located entirely in the front of other boundary lines is not a boundary line, and excludes the ground object from the boundary lines. Therefore, according to the present embodiment, it is possible to prevent a ground object such as a road surface mark, located entirely in the front from other boundary lines, from being erroneously detected as a boundary line, and more appropriately detect the boundary line that defines the parking slot for the vehicle 1. As a result, according to the present embodiment, parking assistance to a more accurate parking target position can be performed.

In the present embodiment, the erroneously-detected line removal unit 147 determines whether or not the rear end of the ground object determined as the boundary line is included in a removal range, which is a range including the front from a position including the vicinity of a front end of a boundary line having the front end on the side farthest from the vehicle 1 before the start of the parking operation among the boundary lines, and determines that the ground object determined as the boundary line is not the boundary line and excludes the ground object from the boundary line when the front and rear ends are included in the removal range. Therefore, according to the present embodiment, it is possible to prevent a ground object such as a road surface mark, included in a range including the front from a position including the vicinity of a front end of a boundary line having the front end on the side farthest from the vehicle 1 before the start of the parking operation among boundary lines, from being erroneously detected as a boundary line, and to more appropriately detect the boundary line that defines the parking slot for the vehicle 1. As a result, according to the present embodiment, parking assistance to a more accurate parking target position can be performed.

Modification

In the above embodiment, the removal range has been set to a range from the vicinity of a front end of a boundary line having the front end on the side farthest from the vehicle 1 before the start of the parking operation among boundary lines to a position immediately before the route on which the vehicle travels before the start of the parking operation. However, the removal range is not limited to this as long as the removal range is a range in the front from the vicinity of a front end of a boundary line having the front end on the side farthest from the vehicle 1 before the start of the parking operation.

In the present modification, at the time of the boundary line recognition process, the erroneously-detected line removal unit 147 sets the determination area set by determination area setting unit 144 as the removal range. Here, it is preferable to set, as the removal range, a determination area based on an end (front end) of a boundary line having the front end on the side farthest from the vehicle 1 before the start of the parking operation among the boundary lines. Further, as described above, the determination area is set in a predetermined range in the front (i.e., the vehicle 1 side before the start of the parking operation) and the rear (i.e., the side opposite to the vehicle 1 before the start of the parking operation) with reference to the end of the ground object. Therefore, the range in the front from the vicinity of the front end, which is an end of the boundary line, is included, and the range in the rear from the front end is also included.

Note that the configuration of the vehicle 1, the configuration of the parking assistance system, and the functional configuration of the ECU 140 according to the present modification are similar to those of the embodiment described above.

Figure 11:
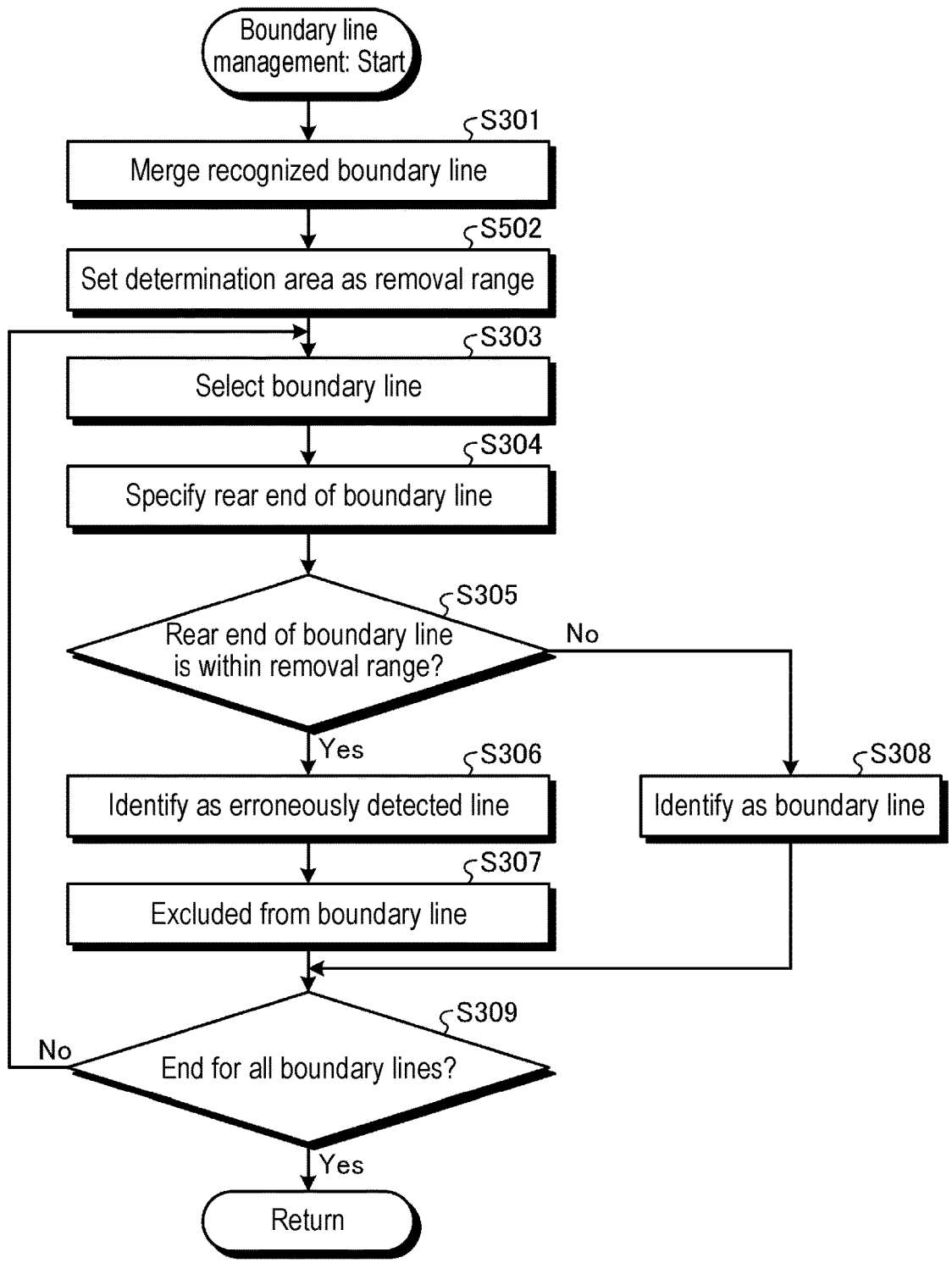
FIG. 11 is a flowchart showing an example of a procedure for a boundary line management process according to a modification.

FIG. 11 is a flowchart showing an example of a procedure for a boundary line management process according to the modification. First, similarly to the above embodiment, the boundary line determination unit 146 merges boundary lines recognized for each captured image (S301), and stores the position information of all the boundary lines and the front and rear ends thereof in the storage unit 150 as boundary line information.

Next, the erroneously-detected line removal unit 147 sets the determination area set by the determination area setting unit 144 as the removal range with reference to the end (front end) of the boundary line having the front end on the side farthest from the vehicle 1 before the start of the parking operation among the boundary lines (S502). The subsequent processing from S303 to S309 is performed in the same manner as in the above embodiment. As a result, it is determined whether or not the front ends and the rear ends of all the boundary lines are included in the determination area as the removal range, and the boundary line having the included front and rear ends is excluded from the boundary line.

For example, in the example shown in FIG. 6, when the erroneously-detected line removal unit 147 sets the determination area 701 as the removal range, the front and rear ends of each of a straight portion 603F, a straight portion 603G, a straight portion 603H, and a straight portion 603I are included in the determination area 701. Therefore, the erroneously-detected line removal unit 147 excludes the boundary lines that respectively include these straight lines, from the boundary lines.

As described above, in the present modification, the erroneously-detected line removal unit 147 sets the determination area set by the determination area setting unit 144 as the removal range at the time of the boundary line recognition process, and determines whether or not the front and rear ends of the ground object determined as the boundary line are included in the removal range, thereby determining whether or not the ground object is the boundary line. Therefore, according to the present modification, it is possible to more appropriately detect the boundary line that defines the parking slot for the vehicle 1 and assist parking at a more accurate parking target position while reducing labor for setting the removal range.

Further, in the present modification, the erroneously-detected line removal unit 147 sets, as the removal range, a determination area set to a predetermined range in the front and rear with reference to the end of the ground object. Moreover, in the present modification, the erroneously-detected line removal unit 147 sets, as the removal range, a determination area set in a predetermined range in the right direction and the left direction with reference to the end of the ground object. Therefore, according to the present modification, a ground object such as a road surface mark, existing in a range not only in the front but also in the rear from the vicinity of the front end of the boundary line, and further in a predetermined range in the right and left directions, can be suppressed from being erroneously detected as a boundary, enabling more appropriate detection of the boundary line that defines the parking slot for the vehicle 1. As a result, according to the present embodiment, parking assistance to a more accurate parking target position can be performed.

Although some embodiments of the present disclosure have been described, these embodiments have been presented as examples, and are not intended to limit the scope of the invention. These novel embodiments can be implemented in various other forms, and various omissions, substitutions, and changes can be made without departing from the gist of the disclosure. These embodiments and modifications thereof are included in the scope and gist of the disclosure, and are included in the invention described in the claims and the equivalent scope thereof.

REFERENCE SIGNS LIST

1: Vehicle, 14: ECU, 14a: CPU, 14b: ROM, 14c: RAM, 14f: SSD, 15: Imaging unit, 141: Captured image acquisition unit, 142: End detection unit, 143: Position information calculation unit, 144: Determination area setting unit, 145: Belonging determination unit, 146: Boundary line detection unit, 147: Erroneously-detected line removing unit, 148: Route calculation unit, 149: Guidance control unit, 150: Storage unit, 701: Determination area, 801: Removal range, and 803: Traveling range

The invention claimed is:

1. A parking assistance device comprising:
a captured image acquisition unit that acquires a captured image obtained by imaging a road surface around a vehicle;
an end detection unit that detects an end of a ground object attached to the road surface included in a detection area set in the captured image;
a position information calculation unit that calculates position information indicating a positional relationship of the end of the ground object detected with the vehicle;
a boundary line determination unit that determines whether or not a ground object having the end is a boundary line that defines a parking slot for the vehicle; and
a removal unit that determines whether or not a rear end of a ground object determined as the boundary line by the boundary line determination unit is included in a removal range, determines that a ground object determined as the boundary line is not the boundary line when the rear end is included in the removal range, and excludes the ground object from boundary lines, the removal range being a range that includes a front, an area on a side close to the vehicle, from a position including a vicinity of a front end of a boundary line having a front end on a side farthest from the vehicle before start of a parking operation among the boundary lines.

2. The parking assistance device according to claim 1, further comprising:
a determination area setting unit that sets a predetermined determination area along the road surface in the captured image on a basis of position information of an end of the boundary line; and
a belonging determination unit that determines whether or not an end of another ground object different from a ground object having the end used for setting the determination area belongs to the determination area, wherein
the boundary line determination unit determines whether or not a ground object having the end used for setting the determination area is a boundary line that defines a parking slot for the vehicle on a basis of a determination result of the belonging determination unit, and
the removal unit sets the determination area as the removal range, and determines whether or not a rear end of a ground object determined as the boundary line is included in the removal range.

3. The parking assistance device according to claim 1, further comprising a determination area setting unit that sets a predetermined determination area along the road surface in the captured image on a basis of position information of an end of the boundary line,
wherein the determination area setting unit sets, as a removal range, the determination area set in a predetermined range in a front that is on a side close to the vehicle and a rear that is on a side far from the vehicle with reference to the end of the ground object.

4. The parking assistance device according to claim 3, wherein the determination area setting unit sets, as a removal range, the determination area set in a predetermined range in a direction orthogonal to the boundary line with reference to the end of the ground object.

* * * * *